United States Patent
Yamada et al.

(10) Patent No.: US 11,097,949 B2
(45) Date of Patent: Aug. 24, 2021

(54) BIS(FLUOROSULFONYL) IMIDE METAL SALT AND METHOD FOR PREPARING SAME

(71) Applicants: MORITA CHEMICAL INDUSTRIES CO., LTD., Osaka (JP); NIPPON SHOKUBAI CO., LTD., Osaka (JP)

(72) Inventors: Kenji Yamada, Osaka (JP); Hirotsugu Shimizu, Osaka (JP); Hiromoto Katsuyama, Suita (JP); Hiroyuki Mizuno, Suita (JP); Yasunori Okumura, Suita (JP); Naohiko Itayama, Suita (JP); Yukihiro Fukata, Suita (JP); Yuichi Sato, Suita (JP); Yasuhiro Higuchi, Suita (JP); Takahiro Yamauchi, Himeji (JP)

(73) Assignees: MORITA CHEMICAL INDUSTRIES CO., LTD., Osaka (JP); NIPPON SHOKUBAI CO., LTD., Osaka (JP)

( * ) Notice: Subject to any disclaimer, the term of this patent is extended or adjusted under 35 U.S.C. 154(b) by 100 days.

(21) Appl. No.: 16/307,315

(22) PCT Filed: Feb. 2, 2018

(86) PCT No.: PCT/JP2018/003663
§ 371 (c)(1),
(2) Date: Dec. 5, 2018

(87) PCT Pub. No.: WO2018/147195
PCT Pub. Date: Aug. 16, 2018

(65) Prior Publication Data
US 2019/0135632 A1    May 9, 2019

(30) Foreign Application Priority Data

Feb. 8, 2017    (JP) .............................. JP2017-021078

(51) Int. Cl.
*C01B 21/086*    (2006.01)
*H01M 8/10*    (2016.01)

(52) U.S. Cl.
CPC ............ *C01B 21/086* (2013.01); *H01M 8/10* (2013.01); *C01P 2004/20* (2013.01); *C01P 2004/32* (2013.01); *C01P 2004/60* (2013.01); *C01P 2006/40* (2013.01); *C01P 2006/90* (2013.01); *Y02P 70/50* (2015.11)

(58) Field of Classification Search
CPC .............. C01P 2004/20; C01P 2004/30; C01P 2004/32; C01P 2004/60; C01P 2004/90; C01P 2006/40; C01P 2006/90; C01B 21/083; C01B 21/086; H01M 8/10; Y02E 60/50; Y02P 70/50
See application file for complete search history.

(56) References Cited

U.S. PATENT DOCUMENTS

| 2012/0014859 A1* | 1/2012 | Honda .................. C01B 21/093 423/386 |
| 2019/0161356 A1* | 5/2019 | Mizuno ................. C01B 21/086 |

FOREIGN PATENT DOCUMENTS

| CA | 2527802 A1 | 6/2007 |
| CN | 104193655 A | 12/2014 |
| EP | 3045426 A1 | 7/2016 |
| EP | 3489192 A1 | 5/2019 |
| JP | 4-305011 A | 10/1992 |
| KR | 10-2016-0055899 A | 5/2016 |
| WO | 2015/072353 A1 | 5/2015 |
| WO | 2016/093400 A1 | 6/2016 |
| WO | 2016/208607 A1 | 12/2016 |

OTHER PUBLICATIONS

ECHA (European Chemicals Agency) Lithium bis(fluorofulfonyl)imide, Particle size distribution), 4 pages, taken from https://echa.europa.eu/registration-dossier/-/registered-dossier/21559/4/6 (Year: 2012).*
Office Action dated Feb. 11, 2020, issued in counterpart EP Application No. 18752060.6.
International Search Report dated May 15, 2018, issued in counterpart application No. PCT/JP2018/003663 (2 pages).
Office Action dated Jan. 21, 2020, issued in counterpart JP Application No. 2018-567407, with English translation (6 pages).
Office Action dated Jul. 27, 2020, issued in counterpart KR Application No. 10-2018-7035738, with English Translation. (11 pages).

* cited by examiner

*Primary Examiner* — Ngoc-Yen Nguyen
(74) *Attorney, Agent, or Firm* — Westerman, Hattori, Daniels & Adrian, LLP

(57) ABSTRACT

In the present invention, a bis (fluorosulfonyl) imide metal salt is an alkali metal salt of bis (fluorosulfonyl) imide or an alkaline earth metal salt of bis (fluorosulfonyl) imide. The bis (fluorosulfonyl) imide metal salt has an average particle diameter of not less than 0.1 mm, or has an average moisture absorption rate of not more than 2.5 mass ppm/cm²·min when sealed in a PE bag having a thickness of 80 μm and left for 30 minutes at 23° C. and 65% humidity.

7 Claims, No Drawings

BIS(FLUOROSULFONYL) IMIDE METAL SALT AND METHOD FOR PREPARING SAME

FIELD

The present invention relates to a bis (fluorosulfonyl) imide metal salt and a method for preparing the same.

BACKGROUND

The salts of fluorosulfonyl imide and their derivatives are useful as intermediates of compounds having N ($SO_2F$) groups or N ($SO_2F$)$_2$ groups. Also, they are useful compounds in a variety of applications such as electrolytes, additives to electrolyte liquids of fuel cells, selective electrophilic fluorinating agents, photo acid generators, thermal acid generators, and near-infrared absorbing dyes.

Generally, salts of fluorosulfonylimide have high hygroscopicity, and when they are made into fine powder, they tends to easily absorb moisture and easily scatter. Therefore, it caused problems of handling difficulties.

Patent Literature 1 describes a method for preparing granules or powder of disulfonylamide alkali metal salt having a mode diameter not more than 80 μm. However, in the method for preparing the disulfonylamide alkali metal salt using solvents, the residual solvents caused problems when the particle diameter is increased.

Patent Literature 2 discloses that a yield of not less than 99% of lithium salt of bis (fluorosulfonyl) imide is obtained by reacting an equimolar amount of bis (fluorosulfonyl) imide and lithium fluoride at 180° C. for 1 hour in an autoclave with solvents of hydrogen fluoride. However, methods for molding the obtained lithium salts are not described.

CITATION LIST

Patent Literature

[Patent Literature 1] WO 2015/072353
[Patent Literature 2] CA 2527802

SUMMARY

Technical Problem

Accordingly, the object of the present invention is to provide bis (fluorosulfonyl) imide metal salt which can hardly absorb moisture, can hardly be scattered, and then, can be easily handled. Additionally, the other object of the present invention is to provide methods for preparing the bis (fluorosulfonyl) imide metal salt.

Solution to Problem

The inventors have intensively studied in order to solve the above-mentioned problems. And as a result, they found that, by subjecting a bis (fluorosulfonyl) imide metal salt to a shaping step in molten state, the bis (fluorosulfonyl) imide metal salt which can hardly absorb moisture, can hardly be scattered, and then, can be easily handled, and which has little residual solvents and impurities can be provided. They also found a method for preparing the bis (fluorosulfonyl) imide salt can be provided. Then finally, they have completed the present invention.

In the present invention, a bis (fluorosulfonyl) imide metal salt, which is an alkali metal salt of bis (fluorosulfonyl) imide or an alkaline earth metal salt of bis (fluorosulfonyl) imide, has an average particle diameter of not less than 0.1 mm.

Further, a bis (fluorosulfonyl) imide metal salt, which is an alkali metal salt of bis (fluorosulfonyl) imide or an alkaline earth metal salt of bis (fluorosulfonyl) imide, has an average moisture absorption rate of not more than 2.5 mass ppm/$cm^2$·min when sealed in a PE bag having a thickness of 80 μm and left for 30 minutes at 23° C. and 65% humidity.

Preferably, the bis (fluorosulfonyl) imide metal salt has a shape being at least one selected from the group consisting of a plate-like shape, a rod-like shape, a block-like shape, a pulverized material shape, a pellet shape, a powder shape, a granule shape, a flake shape, a sphere shape, a hemisphere shape and a particle shape.

Preferably, the bis (fluorosulfonyl) imide metal salt further has a loose bulk specific gravity of less than 1.20.

Further, a method for preparing a bis (fluorosulfonyl) imide metal salt which is an alkali metal salt of bis (fluorosulfonyl) imide or an alkaline earth metal salt of bis (fluorosulfonyl) imide, comprises a shaping step of shaping the bis (fluorosulfonyl) imide metal salt in molten state.

Preferably, the shaping step includes a cooling step after melting the bis (fluorosulfonyl) imide metal salt.

Preferably, a seed crystal is used in the cooling step.

Preferably, a cooling temperature in the cooling step is not more than 140° C.

Preferably, the method for preparing the bis (fluorosulfonyl) imide metal salt comprises a pulverization step of pulverizing a shaped material obtained in the shaping step.

Advantageous Effects of Invention

According to the bis (fluorosulfonyl) imide metal salt and the method for preparing the same of the present invention, the bis (fluorosulfonyl) imide metal salt which can hardly absorb moisture, can hardly be scattered, and then, can be easily handled, and the method for preparing the bis (fluorosulfonyl) imide metal salt can be provided.

DESCRIPTION OF EMBODIMENTS

1. Bis (fluorosulfonyl) imide Metal Salt

In the bis (fluorosulfonyl) imide metal salt of the present invention, the bis (fluorosulfonyl) imide metal salt is the alkali metal salt of bis (fluorosulfonyl) imide or the alkaline earth metal salt of bis (fluorosulfonyl) imide, and has an average particle diameter of not less than 0.1 mm. The average particle diameter is preferably not less than 0.2 mm, more preferably not less than 0.5 mm, further preferably not less than 1 mm, and particularly preferably not less than 3 mm. An upper limit is not particularly limited, for example, it is preferably not more than 50 mm, more preferably not more than 20 mm, and further preferably not more than 10 mm. When the average particle diameter is made as described above, the salt can hardly absorb moisture, can hardly be scattered, and then, can be easily handled. On the other hand, when it is more than the upper limit, the salt can hardly be handled and its dissolution rate into electrolyte solvents becomes low.

The bis (fluorosulfonyl) imide metal salt of the present invention may be a composition containing solvents, unreacted substances, or the like which are included upon the salt preparing. A content of the bis (fluorosulfonyl) imide metal salt in the composition is preferably not less than 98 mass %, more preferably not less than 99 mass %, further preferably not less than 99.5 mass %. In the bis (fluorosulfonyl) imide metal salt of the present invention, it is preferable that an amount of the residual solvents are small. A content of the solvents is preferably not more than 70 mass ppm, more preferably not more than 50 mass ppm, further preferably not more than 30 mass ppm, particularly preferably not more than 10 mass ppm, more particularly preferably not more than 1 mass ppm, and most preferably no solvent (under a detection limit).

As the solvents, for example, an organic solvent can be used. A boiling point of the solvents are, for example, 0 to 250° C. Specifically, examples of the solvents include aprotic solvents. Examples of the aprotic solvents include aliphatic ether solvents such as dimethoxymethane, 1, 2-dimethoxyethane, tetrahydrofuran, 2-methyltetrahydrofuran, 1, 3-dioxane, 4-methyl-1, 3-dioxolane, cyclopentylmethyl ether, methyl-t-butyl ether, diethylene glycol dimethyl ether, diethylene glycol diethyl ether and triethylene glycol dimethyl ether; ester solvents such as methyl formate, methyl acetate, ethyl acetate, isopropyl acetate, butyl acetate and methyl propionate; amide solvents such as N, N-dimethylformamide and N-methyl oxazolidinone; nitro solvents such as nitromethane and nitrobenzene; sulfur-based solvents such as sulfolane, 3-methyl sulfolane and dimethyl sulfoxide; nitrile solvents such as acetonitrile, propionitrile, isobutyronitrile, butyronitrile, valeronitrile and benzonitrile. Also, examples of the solvents include poor solvents for the fluorosulfonylimide alkali metal salt such as aromatic hydrocarbon solvents; linear, branched or cyclic aliphatic hydrocarbon solvents; and aromatic ether solvents.

Examples of the poor solvents include aromatic hydrocarbon solvents such as toluene (boiling point 110.6° C.), o-xylene (boiling point 144° C.), m-xylene (boiling point 139° C.), p-xylene (boiling point 138° C.), ethylbenzene (boiling point 136° C.), isopropylbenzene (boiling point 153° C.), 1,2,3-trimethylbenzene (boiling point 169° C.), 1,2,4-trimethylbenzene (boiling point 168° C.), 1,3,5-trimethylbenzene (boiling point 165° C.), tetralin (boiling point 208° C.), cymene (boiling point 177° C.), methylethylbenzene (boiling point 153° C.) and 2-ethyltoluene (boiling point 164° C.); linear or branched aliphatic hydrocarbon solvents such as octane (boiling point 127° C.), decane (boiling point 174° C.), dodecane (boiling point 217° C.), undecane (boiling point 196° C.), tridecane (boiling point 234° C.), decalin (boiling point 191° C.), 2,2,4,6,6-pentamethylheptane (boiling point 170° C.-195° C.), isoparaffin [e.g., "MARUKASOL R" (a mixture of 2,2,4,6,6-pentamethylheptane and 2,2,4,4,6-pentamethylheptane manufactured by Maruzen Petrochemical Co., LTD., boiling point 178° C.-181° C.), "Isopar (registered trademark) G" (C 9-C 11 mixed isoparaffin manufactured by Exxon Mobil Corporation, boiling point 167° C.-176° C.) and "Isopar (registered trademark) E" (C 8-C 10 mixed isoparaffin manufactured by Exxon Mobil Corporation, boiling point 115° C.-140° C.)]; cyclic aliphatic hydrocarbon solvents such as cyclohexane (boiling point 81° C.), methylcyclohexane (boiling point 101° C.), 1,2-dimethylcyclohexane (boiling point 123° C.), 1,3-dimethylcyclohexane (boiling point 120° C.), 1,4-dimethylcyclohexane (boiling point 119° C.), ethylcyclohexane (boiling point 130° C.), 1,2,4-trimethylcyclohexane (boiling point 145° C.), 1,3,5-trimethylcyclohexane (boiling point 140° C.), propylcyclohexane (boiling point 155° C.), butylcyclohexane (boiling point 178° C.) and alkylcyclohexane having 8 to 12 carbon atoms [e.g., "SWACLEAN 150" (mixture of C9 alkylcyclohexane manufactured by Maruzen Petrochemical Co., LTD, boiling point 152° C.-170° C.)]; aromatic ether solvents such as anisole (boiling point 154° C.), 2-methylanisole (boiling point 170° C.), 3-methylanisole (boiling point 175° C.) and 4-methylanisole (boiling point 174° C.); and the like.

However, the solvents defined by the present invention is not particularly limited to the above specific examples.

Determination of Average Particle Diameter

In the present specification, an average particle diameter means a 50% mass average particle diameter based on JIS Z 8801-1. Specifically, as the bis (fluorosulfonyl) imide metal salt, for example, 50 g of formed bodies of LiFSI [lithium bis (fluorosulfonyl) imide] is put into a standard JIS sieve, and the sieve is covered with an upper lid and a bottom lid. The formed bodies may be the shaped materials described later. After shaking the sieve up and down 300 times, a particle diameter distribution is measured and the 50% average particle diameter is calculated. When there are particles bigger than the mesh size not defined in JIS Z 8801, the 50% average particle diameter can be defined by actually measuring with a calliper and setting a minimum length as the particle diameter instead. When the particle has a hemispherical shape, its diameter can be regarded as the minimum length.

Loose Bulk Specific Gravity

The bis (fluorosulfonyl) imide metal salt of the present invention preferably has a loose bulk specific gravity of less than 1.20. When the salt has the loose bulk specific gravity of in described above value, the salt can hardly absorb moisture, can hardly be scattered, and then, can be easily handled. The loose bulk specific gravity is more preferably less than 1.15. The lower limit of the loose bulk specific gravity is not particularly limited, but may be about 0.50, for example.

The loose bulk specific gravity (d) can be obtained by the following formula according to the Japan Powder Industry Technology Association standard SAP 05-98.

$$d = x/y (g/cm^3)$$

In the above formula, y cm$^3$ is a volume of x g of sample when the x g of sample is naturally fell into a 100 cm$^3$ measuring cylinder from a funnel with a height of 10 cm.

In the bis (fluorosulfonyl) imide metal salt of the present invention, the bis (fluorosulfonyl) imide metal salt is the alkali metal salt of bis (fluorosulfonyl) imide or the alkaline earth metal salt of bis (fluorosulfonyl) imide, and has the average moisture absorption rate of not more than 2.5 mass ppm/cm$^2$·min when sealed in a PE bag having a thickness of 80 μm and left for 30 minutes at 23° C. and 65% humidity. The original water content of the bis (fluorosulfonyl) imide metal salt for measuring the moisture absorption rate at 23° C. and 65% humidity is 1 to 1000 mass ppm, preferably 1 to 500 mass ppm, more preferably 1 to 100 mass ppm, further preferably 1 to 60 ppm by mass.

The moisture absorption rate is preferably not more than 2.0 mass ppm/cm$^2$·min, more preferably not more than 1.5 mass ppm/cm$^2$·min, further preferably not more than 1.0 mass ppm/cm$^2$·min. A lower limit is preferably 0 mass ppm/cm$^2$·min. When the moisture absorption rate is set as above-described range, the salt can hardly absorb moisture, can hardly be scattered, and then, can be easily handled.

2. Shaped Material of Bis (fluorosulfonyl) imide Metal Salt

The shaped material of the bis (fluorosulfonyl) imide metal salt of the present invention preferably has a shape being at least one selected from the group consisting of a plate-like shape, a rod-like shape, a block-like shape, a pulverized material shape, a pellet shape, a powder shape, a granule shape, a flake shape, a sphere shape, a hemisphere shape and a particle shape.

3. Method for Preparing Bis (fluorosulfonyl) imide Metal Salt

In the present invention, the method for preparing the bis (fluorosulfonyl) imide metal salt, which is the alkali metal salt of bis (fluorosulfonyl) imide or the alkaline earth metal salt of bis (fluorosulfonyl) imide, comprises the shaping step of shaping the bis (fluorosulfonyl) imide metal salt in molten state.

In the method for preparing the bis (fluorosulfonyl) imide metal salt of the present invention, a temperature of the bis (fluorosulfonyl) imide metal salt in the molten state is preferably not less than 80° C.

In the method for preparing the bis (fluorosulfonyl) imide metal salt of the present invention, the shaping step preferably includes a cooling step after melting the bis (fluorosulfonyl) imide metal salt.

Further, in the method for preparing the bis (fluorosulfonyl) imide metal salt of the present invention, a cooling temperature in the cooling step is preferably not less than 40° C. and not more than 140° C.

In the method for preparing the bis (fluorosulfonyl) imide metal salt of the present invention, the bis (fluorosulfonyl) imide metal salt is preferably prepared by reacting a mixture containing bis (fluorosulfonyl) imide and an alkali metal compound or an alkaline earth metal compound (hereinafter simply referred to as a metal compound in the present specification). Further, after the reaction, a ratio of total mass of the bis (fluorosulfonyl) imide, the metal compound, and the bis (fluorosulfonyl) imide metal salt to mass of an entire reacted mixture is more preferable not less than 0.8.

In the present invention, methods for preparing the bis (fluorosulfonyl) imide is not particularly limited. For example, the method for preparing the bis (fluorosulfonyl) imide from a bis (sulfonyl halide) imide by using a fluorinating agent can be used. In the bis (sulfonyl halide) imide, Cl, Br, I and At other than F are exemplified as a halogen.

A fluorination step of preparing the bis (fluorosulfonyl) imide by using the fluorinating agent from the bis (sulfonyl halide) imide will be described below.

Fluorination Step

In the fluorination step, the fluorination reaction of the bis (sulfonyl halide) imide is carried out. For example, a method described in CA2527802, and a method described in Jean'ne M. Shreeve et al., Inorg. Chem. 1998, 37 (24), 6295-6303 can be used. The bis (sulfonyl halide) imide as a starting raw material may be a commercially available one. It can also be a compound prepared by known methods. In addition, a method, described in JP 1996-511274 A, for preparing the bis (fluorosulfonyl) imide by using urea and fluorosulfonic acid can be used.

As the method for preparing the bis (fluorosulfonyl) imide by using the fluorinating agent from the bis (sulfonyl halide) imide, the method for using hydrogen fluoride as the fluorinating agent can be preferably used. As an example, a fluorination reaction of bis (chlorosulfonyl) imide is represented by formula (1) indicated below. For example, the bis (fluorosulfonyl) imide can be obtained by introducing the hydrogen fluoride into the bis (chlorosulfonyl) imide.

[Formula 1]

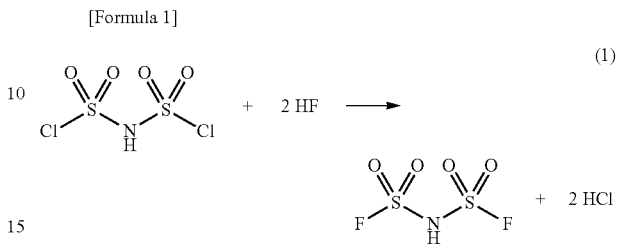

A molar ratio of the hydrogen fluoride to the bis (sulfonyl halide) imide at the starting point of the fluorination step is preferably not less than 2.0. As a lower limit, not less than 2.1 or not less than 2.2 can be exemplified. As an upper limit, not more than 10, not more than 5, not more than 3.0 or not more than 2.5 can be exemplified. By setting the molar ratio in this manner, the fluorination of the bis (sulfonyl halide) imide can be carried out more surely. In case of a small amount of use, it is not preferable because the reaction rate is lowered, and because the reaction is not sufficiently carried out. In case of a large amount of use, it is not preferable because the recovery of raw materials becomes complicated and the productivity may decrease.

The fluorination step is performed at a temperature not less than 20° C., not less than 40° C., not less than 60° C. or not less than 80° C. as a lower limit. As an upper limit of the temperature, not more than 200° C., not more than 160° C., not more than 140° C. or not more than 120° C. can be mentioned.

The temperature can be selected appropriately by examining the reaction rate. The fluorination step can be carried out under either high pressure or normal pressure.

Metal Salt Production Step

In a metal salt production step, the bis (fluorosulfonyl) imide metal salt is produced by reacting a mixture containing the bis (fluorosulfonyl) imide obtained by the above-mentioned methods and the metal compound. In methods of charging the bis (fluorosulfonyl) imide and the metal compound, the reaction may be started after charging each material initially, or the reaction may be started while each material is continuously charged. When charging continuously, each material may be charged separately, or slurry of the materials may be prepared in advance and put the slurry in.

The reacted mixture is obtained by reacting the mixture containing the bis (fluorosulfonyl) imide and the metal compound. The reacted mixture includes the unreacted bis (fluorosulfonyl) imide, the unreacted metal compound, and the bis (fluorosulfonyl) imide metal salt. After the reaction, a total of mass ratios of the bis (fluorosulfonyl) imide, the metal compound and the bis (fluorosulfonyl) imide metal salt to the entire reacted mixture is not less than 0.8, preferably not less than 0.85, more preferably not less than 0.9, further preferably not less than 0.95. After the reaction, when the total of mass ratios of the bis (fluorosulfonyl) imide, the metal compound and the bis (fluorosulfonyl) imide metal salt to the entire reacted mixture is in such a range, the reaction is easily handled because a reaction vessel such as an autoclave is not needed.

In the mixture containing the bis (fluorosulfonyl) imide and the metal compound at the beginning of the reaction, a total of mass ratios of the bis (fluorosulfonyl) imide and the metal compound to the entire mixture containing bis (fluorosulfonyl) imide and the metal compound is preferably not less than 0.8, more preferably not less than 0.85, further preferably not less than 0.9, particularly preferably not less than 0.95. At the beginning of the reaction, when the total of mass ratios of the bis (fluorosulfonyl) imide and the metal compound to the entire mixture containing bis (fluorosulfonyl) imide and the metal compound is in such a range, the reaction is easily handled because a reaction vessel such as an autoclave is not needed.

As the metal compound, alkali metals are preferable.

As the alkali metals, Li, Na, K, Rb, Cs or the like can be exemplified, and Li is preferable. As alkaline earth metals, Mg, Ca, Sr and Ba can be exemplified.

Examples of the alkali metal compound include hydroxides such as LiOH, NaOH, KOH, RbOH and CsOH; carbonates such as $Li_2CO_3$, $Na_2CO_3$, $K_2CO_3$, $Rb_2CO_3$ and $Cs_2CO_3$; hydrogencarbonates such as $LiHCO_3$, $NaHCO_3$, $KHCO_3$, $RbHCO_3$ and $CsHCO_3$; chlorides such as LiCl, NaCl, KCl, RbCl, CsCl; fluorides such as LiF, NaF, KF, RbF and CsF; alkoxide compounds such as $CH_3OLi$ and EtOLi; alkyl-lithium compounds such as EtLi, BuLi and t-BuLi (Et represents an ethyl group, Bu represents a butyl group); or the like. Examples of the alkaline earth metal compound include hydroxides such as $Mg(OH)_2$, $Ca(OH)_2$, $Sr(OH)_2$ and $Ba(OH)_2$; carbonates such as $MgCO_3$, $CaCO_3$, $SrCO_3$ and $BaCO_3$; chlorides such as $MgCl_2$, $CaCl_2$, $SrCl_2$ and $BaCl_2$; fluorides such as $MgF_2$, $CaF_2$, $SrF_2$ and $BaF_2$; or the like.

In the method for preparing the bis (fluorosulfonyl) imide metal salt of the present invention, it is preferable that the metal compound is the alkali metal halide as the alkali metal compound, and that the method includes a step of removing hydrogen halides formed during the reaction. Further, it is preferable that the alkali metal compound is lithium fluoride, and that the method includes a step of removing a hydrogen fluoride formed during the reaction.

As the alkali metals, among these, alkali metal halides such as LiF, NaF, KF, LiCl, NaCl and KCl are preferable, and LiF is particularly preferable.

As an example, preparation of bis (fluorosulfonyl) imide lithium salt [lithium bis (fluorosulfonyl) imide] by reacting a mixture containing bis (fluorosulfonyl) imide and LiF is represented by formula (2) indicated below.

[Formula 2]

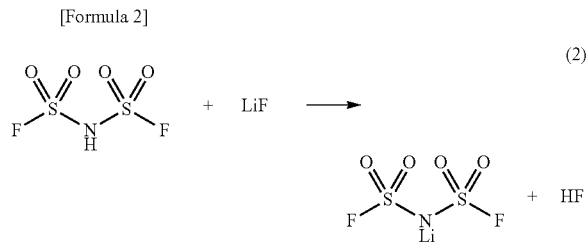

(2)

There is a possibility that the reacted mixture obtained after the reaction of the mixture containing the bis (fluorosulfonyl) imide and LiF includes unreacted bis (fluorosulfonyl) imide and unreacted LiF. The reacted mixture at least includes lithium salt of bis (fluorosulfonyl) imide and by-produced HF. The reacted mixture obtained after the reaction preferably includes $FSO_2NH_2$ and/or $LiFSO_3$.

After the reaction, a total of mass ratios of the bis (fluorosulfonyl) imide, LiF and the lithium salt of the bis (fluorosulfonyl) imide to an entire reacted mixture is preferably not less than 0.8, more preferably not less than 0.85, further preferably not less than 0.9, particularly preferably not less than 0.95. After the reaction, when the total of mass ratios of the bis (fluorosulfonyl) imide, LiF and the lithium salt of bis (fluorosulfonyl) imide to the entire reacted mixture is in such a range, a reaction vessel such as an autoclave is not needed, and a removal of hydrogen fluoride after the reaction becomes easy. Therefore, preferably, it is possible to provide the method for producing the bis (fluorosulfonyl) imide alkali metal salt, which can reduce the amount of hydrogen fluoride having high corrosivity and can easily remove hydrogen fluoride from the product. It is also preferable that a step of removing hydrogen fluoride formed during the reaction is included.

A total of mass ratios of the mixture containing bis (fluorosulfonyl) imide and LiF to the entire mixture containing the bis (fluorosulfonyl) imide and LiF at the beginning of the reaction is preferably not less than 0.8, more preferably not less than 0.85, further preferably not less than 0.9, particularly preferably not less than 0.95. When the total of mass ratios to the entire mixture containing the bis (fluorosulfonyl) imide and LiF at the beginning of the reaction is in such a range, a reaction vessel such as an autoclave is not needed and the removal of hydrogen fluoride after the reaction becomes easier.

In the metal salt production step, hydrogen fluoride can be used in such a range that the total of mass ratios of the bis (fluorosulfonyl) imide, the metal compound and the bis (fluorosulfonyl) imide metal salt to the entire mixture after the reaction is not less than 0.8. In the metal salt production step, hydrogen fluoride may not be used.

Also, in the method for preparing the bis (fluorosulfonyl) imide metal salt by the reaction of the mixture containing the bis (fluorosulfonyl) imide and the alkali metal compound or the alkaline earth metal compound of the present invention, when the metal compound is lithium fluoride, it is preferable that a step of proceeding the mixture while removing the hydrogen fluoride at a pressure of not higher than 1013 hPa is included. The proceeding includes reaction, aging, and/or devolatilization.

In the method for preparing the bis (fluorosulfonyl) imide metal salt of the present invention, the total of mass ratios of the bis (fluorosulfonyl) imide and the alkali metal compound or the alkaline earth metal compound to the entire mixture containing bis (fluorosulfonyl) imide and the metal compound at the beginning of the reaction is preferably not less than 0.8. The metal salt preparing reaction is carried out with a small amount of solvent or preferably without solvent. When the metal compound is lithium fluoride, in order to promote the lithiation reaction, it is effective to remove HF (hydrogen fluoride) generated as a by-product from the system. The increase in the purity of LiFSI [bis (fluorosulfonyl) imide lithium salt] is limited, even if the mixture is aged at normal pressure at near the end of the reaction. The purity of LiFSI is effectively improved by removing HF under reduced pressure.

In the method for preparing the bis (fluorosulfonyl) imide metal salt of the present invention, the bis (fluorosulfonyl) imide metal salt having small residual solvents are obtained.

A reaction temperature of the mixture containing the bis (fluorosulfonyl) imide and the metal compound is not less than 50° C., preferably not less than 80° C., more preferably not less than 100° C., further preferably not less than 120° C. An upper limit of the temperature is not more than 180° C., or not more than 160° C. The reaction can be performed even at 140° C., or 150° C. If the reaction temperature is too low, undesirably, the reaction may not proceed sufficiently. If the reaction temperature is too high, undesirably, the product may decompose. The reaction may start at normal temperature, and then, the reaction temperature may increase gradually. Also, the reaction may start under heated condition. In order to proceed the reaction sufficiently, it is preferably near the melting point of the bis (fluorosulfonyl) imide metal salt at the end of the reaction. In the case of lithium bis (fluorosulfonyl) imide, since the melting point is 143° C., the temperature at the end of preparing metal salt is preferably not less than 130° C., more preferably not less than 140° C. It is preferably not more than 170° C., more preferably not more than 160° C.

A pressure range of the reaction is preferably not higher than 1250 hPa, more preferably not higher than 1150 hPa, further preferably not higher than 1050 hPa. An inert gas such as nitrogen may or may not be introduced into the solution for the purpose of promoting the reaction.

A molar ratio of the alkali metal or the alkaline earth metal included in the metal compound to bis (fluorosulfonyl) imide is preferably not less than 0.80 and not more than 1.20, more preferably not less than 0.90 and not more than 1.10, further preferably not less than 0.95 and not more than 1.05, most preferably around 1.00. When an amount of bis (fluorosulfonyl) imide is excessive, the excess bis (fluorosulfonyl) imide can be removed by devolatilization. When the alkali metal or the alkaline earth metal included in the metal compound is excessive, the excess alkali metal or the alkaline earth metal can be removed from the obtained bis (fluorosulfonyl) imide metal salt composition by filtering the obtained bis (fluorosulfonyl) imide metal salt composition in molten state or after dissolving in electrolyte solvents.

In the metal salt production step, the bis (fluorosulfonyl) imide metal salt is obtained in molten state. A temperature of the bis (fluorosulfonyl) imide metal salt in molten state is preferably not less than 80° C., more preferably not less than 100° C., further preferably not less than 140° C. An upper limit is preferably not more than 180° C., more preferably not more than 160° C., further preferably not more than 150° C.

The mixture containing the bis (fluorosulfonyl) imide and the alkali metal compound or the alkaline earth metal compound may be aged after the reaction. An aging temperature is not less than 50° C., preferably not less than 80° C., more preferably not less than 100° C., further preferably not less than 120° C. An upper limit of the temperature is not more than 180° C., or not more than 160° C. The aging can be performed even at 140° C., or 150° C. If the aging temperature is too low, undesirably, the aging may not proceed sufficiently. If the aging temperature is too high, undesirably, the product may be decomposed. In the present invention, when the alkali metal compound is lithium fluoride, the aging preferably proceeds while removing hydrogen fluoride at a pressure of not higher than 1013 hPa. The removal of the hydrogen fluoride may proceed by introducing gases into the system. Examples of the usable gases include inert gases such as nitrogen and argon, and dry air.

Devolatilization Step

A devolatilization step may be carried out after the metal salt production step. As a result, unreacted bis (fluorosulfonyl) imide and gases by-produced by the reaction can be removed. The devolatilization step is preferably carried out at a temperature not lower than the melting point of the bis (fluorosulfonyl) imide metal salt. In the case of lithium bis (fluorosulfonyl) imide, the devolatilization temperature is preferably not less than 143° C. and not more than 160° C. When the devolatilization is performed at a temperature of lower than this temperature range, the melt may solidify during devolatilization. When the devolatilization is performed at a temperature of higher than this temperature range, decomposition may occur. A pressure range of the devolatilization may be changed according to the devolatilization progresses, and the final pressure is not higher than 50 kPa, preferably not higher than 10 kPa, more preferably not higher than 5 kPa. In order to promote the devolatilization, an inert gas such as nitrogen may be introduced into the solution. However, the inert gas may not be introduced.

Shaping Step

In the shaping step, the shaped material of the bis (fluorosulfonyl) imide metal salt is produced from the bis (fluorosulfonyl) imide metal salt in molten state. As the bis (fluorosulfonyl) imide metal salt in molten state, the bis (fluorosulfonyl) imide metal salt obtained in molten state in the production process can be directly used. The bis (fluorosulfonyl) imide metal salt obtained as powder or the like can be also used by heating and melting to be in molten state. As shaping methods, any method can be used as long as it is solidified from the molten state, and dry processes and wet processes can be exemplified.

As the dry processes, the following molding methods or the like are exemplified.

- A drum flake granulation method in which a molten liquid is applied to a rotating drum surface, cooled and solidified to be shaped into a flake shape
- A casting method in which a molten liquid is poured into a mold, cooled and solidified to be shaped into a shape of the mold
- A roll-drop steel belt granulation method in which, for example, a small amount of molten liquid is scooped with comb teeth of a rotating drum, dropped on a surface of a horizontally moving metal belt, cooled and solidified to be shaped into a hemispherical shape, and then, a solidified pellet is peeled off from the belt and collected by passing through a scraper arranged on the other end of the belt [Roll-Drop Type-Steel Belt Granulator manufactured by Nippon Berding Co., Ltd., as an example]
- A rotoform steel belt granulation method in which a molten liquid is extruded uniformly from a hole of rotating outer shell on a surface of a horizontally moving metal belt, cooled and solidified to be shaped into a hemispherical shape, and then, a solidified pellet is peeled off from the belt and collected by passing it through a scraper arranged on the other end of the belt or by using the curvature of the belt [Rotoform Granulation Systems manufactured by Sandvik K. K.]
- A droplet dropping granulation method in which a molten liquid is broken up with a vibrator little by little into a droplet, and the droplet is naturally dropped, cooled and solidified in cooling nitrogen vaporized liquid nitrogen or in cooled and dried air to shape a spherical droplet [Microsphere/Capsule Production Unit manufactured by BRACE GmbH, as an example]
- A prilling tower granulation method in which a molten liquid is sprayed from a nozzle and finely dispersed in a mist form, solidified by cooling in contact with cool wind upon falling down to shape into a spherical shape having a particle diameter of 0.1 mm to 3 mm A screw extrusion-type granulation method in which a flowing or semi-flowing molten liquid is extruded from a screen die by screw, solidified by cooling, cut, and shape into a spherical shape, or a hemispherical shape A method in which a molten liquid is extruded into a plate shape, a block shape, a rod shape or the like, solidified by cooling, and then pulverized with a pulverizer to obtain a pulverized material A melt crystallization method Some of the above methods may be combined.

Examples of the wet processes include solvent crystallization, recrystallization, concentration and solidification, a method of extruding the melt into a poor solvent, cooling and solidifying, and the like.

Among them, the rotoform steel belt granulation method and the roll-drop steel belt granulation method are one of preferable granulation methods because of little metal-to-metal contact structurally and little contamination. Among them, the rotoform steel belt granulation method is preferable. In the pellet produced in the rotoform steel belt granulation method, a preferable size of the pellet as a hemispherical diameter is more preferably not less than 0.5 mm, further preferably not less than 1 mm, and particularly preferably not less than 3 mm. Although an upper limit is not particularly limited, and for example, it is preferably not more than 50 mm, more preferably not more than 20 mm, and further preferably not more than 10 mm.

By setting the particle diameter in this manner, the salt can hardly absorb moisture, can hardly be scattered, and then, can be easily handled. On the other hand, when the particle diameter is more than the upper limit, the handling property becomes worse and the dissolution rate into the electrolyte solvent becomes low.

Further, the method in which the molten liquid is extruded into the plate shape, the block shape, the rod shape or the like, solidified by cooling, and then pulverized with a pulverizer to obtain a pulverized material is also one of a preferable embodiment because the shaped material can be produced under conditions of relatively high flexibility.

In the present invention, the method for preparing the bis (fluorosulfonyl) imide metal salt may comprise a grinding step of grinding the shaped material obtained in the shaping step.

Cooling Step

The shaping step preferably includes a cooling step after melting the bis (fluorosulfonyl) imide metal salt. The cooling temperature in the cooling step is not limited as long as the melting bis (fluorosulfonyl) imide metal salt can be solidified. The cooling temperature is preferably not less than a room temperature, more preferably not less than 40° C., and further preferably 50 to 60° C. An upper limit is preferably not more than 140° C., more preferably not more than 100° C., further preferably not more than 80° C., particularly preferably less than 80° C.

The cooling temperature may be constant, or it may be changed stepwise. When changing stepwise, as an example, a crystal nucleus generation step and a crystal growth step are included, and the temperature is set suitable for each step. A cooling temperature in the crystal nucleus generation step is preferably not less than 0° C., more preferably not less than 20° C., further preferably not less than 30° C. It is preferably not more than 90° C., more preferably not more than 70° C., further preferably not more than 50° C. A cooling temperature in the crystal growth step is preferably not less than 30° C., more preferably not less than 40° C., and further preferably not less than 50° C. It is preferably not more than 110° C., more preferably not more than 90° C., further preferably not more than 70° C., particularly preferably not more than 60° C.

In the cooling step, seed crystals are preferably used.

By contacting with a small amount of crystals (seed crystals) during solidification by cooling, the crystal growth time can sometimes be shortened. In this case, in a method of contacting with the small amount of crystals, the crystals may be attached to a belt or a metal mold beforehand, or a slight residue left behind after removing the product solidified previously may be used as in the case of solidifying by cooling on the rotating drum or the rotating belt.

The production of the shaped material of bis (fluorosulfonyl) imide metal salt may be carried out under reduced pressure, or may be carried out while supplying gases to a shaped material manufacturing apparatus. Examples of usable gases include inert gases such as nitrogen and argon, and dry air.

The production of the shaped material of bis (fluorosulfonyl) imide metal salt is preferably carried out in an environment having a dew point of −25° C. in order to prevent moisture absorption. More preferably not more than −30° C., further preferably not more than a dew point of −40° C., particularly preferably not more than a dew point of −50° C., more preferably not more than −60° C.

The raw materials such as bis (chlorosulfonyl) imide, hydrogen fluoride, and the alkali metal compound, preferably used in the above-mentioned steps, can be purified with known methods such as distillation, crystallization and reprecipitation after dissolve in solvents if necessary.

Preferably, the bis (chlorosulfonyl) imide, the hydrogen fluoride and the alkali metal compound used as raw materials; the bis (fluorosulfonyl) imide and the bis (fluorosulfonyl) imide alkali metal salt as products; and hydrogen chloride, hydrogen fluoride, and the like which may be generated as by-products can be recovered by known methods such as distillation, crystallization and reprecipitation after dissolving in solvents if necessary.

4. Non-Aqueous Electrolytic Solution

The bis (fluorosulfonyl) imide metal salt of the present invention [particularly, lithium bis (fluorosulfonyl) imide] is suitably used as a non-aqueous electrolytic solution used in, for example, an electric double layer capacitor, a lithium ion cell and a lithium ion capacitor. A content of the bis (fluorosulfonyl) imide metal salt in the electrolytic solution is preferably more than 0.5 mol/L and not more than 6.0 mol/L, more preferably not less than 0.6 mol/L and not more than 4.0 mol/L, further preferably not less than 0.6 mol/L and not more than 2.0 mol/L, and most preferably not less than 0.6 mol/L and not more than 1.5 mol/L. By setting the content of the bis (fluorosulfonyl) imide metal salt in the electrolytic solution to such a range, cell performance can be improved.

The electrolytic solution may contain other known components. Examples of the other components include the other lithium salts such as $LiPF_6$, radical scavengers such as antioxidants and flame retardants, and redox type stabilizers.

Solvents which can be used for the electrolytic solution are not particularly limited as long as they can dissolve and disperse electrolytic salts (for example, the sulfonylimide compounds and the above-mentioned lithium salts). Examples of the solvents include non-aqueous solvents such as cyclic carbonates and chain carbonates, and media such as polymers and polymer gels used in place of solvents. As the solvents, any of the conventionally known solvents used in cells can be used.

5. Antistatic Agent

The bis (fluorosulfonyl) imide metal salt of the present invention [particularly, lithium bis (fluorosulfonyl) imide] is also suitably used as antistatic agent for imparting antistatic performance to polymeric materials.

Examples of the polymer materials include thermoplastic resins, thermosetting resins, rubber and the like.

Examples of the thermoplastic resins include polyolefin resins such as polyethylene, polypropylene and polystyrene, and compositions thereof; polyacetal, polyacrylate, acrylic resin and compositions thereof; polyphenylene ether type resins such as polyphenylene ether (PPE), PPE/polystyrene, PPE/polyamide (PA) and PPE/polybutylene terephthalate (PBT), and compositions thereof; polyester type resins such as polyether ketone, polyethylene terephthalate (PET) and PBT/ABS, and compositions thereof; polycarbonate resins such as polycarbonate (PC), PC/ABS, PC/PET and PC/PBT, and compositions thereof; polyurethane and its composition; polyvinyl chloride, polyvinylidene chloride; polyimide, polyetherimide, polyamideimide; polyphenylene sulfide type resin and its composition; polysulfone, and the like. It is preferable to use one or more of these. Among them, acrylic resins, polyester resins, polyamide resins, polyurethane resins, polyvinyl chloride resins, and epoxy resins are more preferable on the viewpoint of excellent conductivity, and it is preferable to use at least one kind of these resins as the polymer materials.

Examples of the thermosetting resins include phenol resins, urea resins, melamine resins, alkyd resins, unsaturated polyester resins, epoxy resins, silicon resins, polyurethane resins and the like, and one or more of these can be used preferably.

Examples of the rubber include urethane rubber, acrylic rubber, acrylonitrile-butadiene rubber, epichlorohydrin rubber, epichlorohydrin-ethylene oxide copolymer rubber, silicone rubber, fluoro olefin vinyl ether copolymer urethane rubber, styrene butadiene copolymer rubber and their foams and the like, and it is preferable to use one or more of them.

An amount of blending antistatic agent may be appropriately determined depending on the application, and it is preferably, for example, not less than 0.1 parts by mass and not more than 50 parts by mass to 100 parts by mass of the above polymer materials. More preferably not less than 1 part by mass, further preferably not less than 5 parts by mass, more preferably not more than 20 parts by mass, further preferably not more than 10 parts by mass. When the amount of blending antistatic agent is too large, the antistatic agent may bleed. On the other hand, when the amount of blending antistatic agent is too small, it may be difficult to obtain desired antistatic performance.

The antistatic agent using the bis (fluorosulfonyl) imide metal salt of the present invention can be suitably used as antistatic agents used in, for example, conductive sheets; PCT (Pressure Cooker Test) elements; charging members in electrophotographic printers, copying machines or the like, cleaning members, developing members, transfer members; various formed bodies such as polymer temperature sensitive materials, household appliances/office automation equipment, housing products such as game machines and office equipment and the like, various plastic containers such as IC (integrated circuit) trays, films for various packaging materials, sheets for flooring materials, artificial turf, mats, and automobile parts; resin materials having antistatic properties.

EXAMPLES

Hereinafter, the present invention will be described in more detail with reference to examples, but the present invention is originally not limited by the following examples, and appropriate modifications are of course also possible to make within a range that can conform to the gist of the foregoing and the following to implement the invention, and all of them are included in the technical scope of the present invention.

Measurement of Average Particle Diameter 50 g of formed bodies of LiFSI [lithium bis (fluorosulfonyl) imide] was put into a standard JIS sieve according to JIS Z 8801-1, and the sieve was covered with an upper lid and a bottom lid. After shaking the sieve up and down 300 times, a particle diameter distribution was measured and the 50% average particle diameter was calculated. When there were particles bigger than the mesh size not defined in JIS Z 8801, the 50% average particle diameter was defined by actually measuring with a calliper and setting a minimum length as the particle diameter instead.

Measurement of Loose Bulk Specific Gravity

The loose bulk specific gravity (d) was obtained by the following formula according to the Japan Powder Industry Technology Association standard SAP 05-98.

$$d = x/y (g/cm^3)$$

In the above formula, y $cm^3$ was a volume of x g of sample when the x g of sample was naturally fell into a 100 $cm^3$ measuring cylinder from a funnel with a height of 10 cm.

Measurement of Amount of Residual Solvent:
Headspace Gas Chromatography Analysis Method
Chromatography Analysis Method 200 µl of dimethylsulfoxide aqueous solution (dimethylsulfoxide/ultrapure water=20/80, volume ratio), and 2 ml of 20 mass % sodium chloride aqueous solution were added to 0.05 g of the LiFSI composition obtained in the following examples to make a measurement solution. The measurement solution was placed in a vial bottle, hermetically sealed, and measured an amount of residual solvent contained in fluorosulfonylimide alkali metal salt with headspace-gas chromatography system ("Agilent 6890", manufactured by Agilent Technologies, Inc.).

Apparatus: Agilent 6890
Column: HP-5 (length: 30 m, column inner diameter: 0.32 mm, film thickness: 0.25 µm) (manufactured by Agilent Technologies, Inc.)
Column temperature condition: 60° C. (held for 2 minutes), heating up to 300° C. by 30° C./minute, 300° C. (held for 2 minutes)
Head space condition: 80° C. (held for 30 minutes)
Injector temperature: 250° C.
Detector: FID (300° C.)

Example 1

11.70 g (0.45 mol) of LiF was weighed out and put into a PFA reaction vessel. The reaction vessel was cooled with ice, and 95.9 g (0.53 mol) of HFSI [bis (fluorosulfonyl) imide] was added. The solution for reaction was heated to 120° C. and reacted for 1.5 hours. The reacted solution was dried under reduced pressure for 2 hours at 10 hPa at 140° C. to 145° C. As a result, 73 g of LiFSI was obtained (in molten state).

The obtained LiFSI was sucked with a dropper while maintaining its temperature at 140° C. to 145° C., quickly fell down as a droplet on a plate made of SUS 304 heated to 60° C. and solidified to obtain pellets. The mass average particle diameter of the pellets after solidification was 4.8 mm. The water content was 54 mass ppm. In addition, the amount of residual solvent was below the detection limit (not more than 1 mass ppm). The loose bulk specific gravity of the obtained pellets was 1.12. The above reaction and operation were carried out in a dry room having a dew point of not more than −50° C.

Example 2

905 g (5.00 mol) of HFSI [bis (fluorosulfonyl) imide] and 132 g (5.10 mol) of LiF were put into a stainless reaction vessel equipped with a nitrogen introduction tube and a reflux tube. The solution for reaction was heated to 150° C. with stirring. Thereafter, the inside pressure of the reaction vessel was reduced, and the reaction solution was heated at 10 hPa and 145° C. to 150° C. for 2 hours. As a result, 890 g (4.76 mol) of LiFSI was obtained (in molten state).

The obtained reacted solution was transferred with adding pressure through a heating pipe to a connected steel belt type granulating apparatus (Rotoform M1) manufactured by Sandvik K. K. The molten liquid was extruded on the steel belt at 160° C. with an outer shell (opening diameter: 2 mmϕ) of a granulating section. The extruded molten liquid was scrapped off with a scraper, and the scrapped material was not collected until the steel belt took to complete one revolution. The pellets were collected after the belt taken to complete one revolution. At this time, the crystal nucleus generation time was set to 1 minute and the crystal growth time was set to 2 minutes, and the belt temperature in each was set to 25° C. and 60° C.

The obtained pellets had the hemispherical shape and had the mass average diameter of 5.7 mmϕ. The water content was 17 mass ppm. In addition, the amount of residual solvent was below the detection limit. The loose bulk specific gravity of the obtained pellets was 1.24. The above reaction and operation were carried out in a dry room having a dew point of not more than −50° C.

Example 3

905 g (5.00 mol) of HFSI [bis (fluorosulfonyl) imide] and 129 g (4.98 mol) of LiF were put into a stainless reaction vessel equipped with a nitrogen introduction tube and a reflux tube. The solution for reaction was heated to 150° C. with stirring, and reacted for 1.5 hours. Thereafter, the reaction solution was heated at 10 hPa and 145 to 150° C. for 2 hours. As a result, 890 g (4.76 mol) of LiFSI was obtained (in molten state).

A pipe for pulling out products was connected to this reaction vessel, and the LiFSI molten liquid was pulled out by pressurizing through a nitrogen introduction pipe. The molten liquid was pulled out to a mold having a depth of 1 cm, a width of 1.75 cm, and a length of 2 cm, and the mold was cooled at 50° C. to obtain a block-shaped material of LiFSI. By measuring the obtained shaped material of LiFSI with a caliper, the minimum length was 10 mm. In addition, the water content was 7 mass ppm. The amount of residual solvent was below the detection limit. The above reaction and operation were carried out in a dry room having a dew point of −50° C. or less.

Example 4

11.70 g (0.45 mol) of LiF was weighed out and put into a PFA reaction vessel. The reaction vessel was cooled with ice, and 95.9 g (0.53 mol) of HFSI [bis (fluorosulfonyl) imide] was added. The solution for reaction was heated to 145° C. Thereafter, the inside pressure of the reaction vessel was reduced, and the reaction solution heated at 10 hPa and 145° C. to 150° C. for 2 hours. As a result, 73 g of LiFSI was obtained (in molten state).

The obtained LiFSI was sucked with a dropper while maintaining in molten state, quickly fell down as a droplet on a plate made of SUS 304 heated to 60° C. and solidified to obtain pellets. The mass average particle diameter of the pellets after solidification was 5.4 mm. The water content was 10 mass ppm. The loose bulk specific gravity of the obtained pellets was 1.10. The above reaction and operation were carried out in a dry room having a dew point of not more than −50° C.

Comparative Example 1

1800 g of butyl acetate was added to a Pyrex (registered trademark) reaction vessel A (internal capacity 10 L) equipped with a stirrer under nitrogen stream, and 200 g (934 mmol) of bis (chlorosulfonyl) imide was added dropwise at room temperature (25° C.).

101 g [982 mmol, 1.05 equivalents based on bis (chlorosulfonyl) imide] of zinc fluoride was added all at once at room temperature to the obtained butyl acetate solution of bis (chlorosulfonyl) imide, and stirred at room temperature for 6 hours to be completely dissolved.

540 g (7928 mmol, 8.49 equivalents based on bis (chlorosulfonyl) imide) of 25 mass % aqueous ammonia was added to Pyrex (registered trademark) reaction vessel B (internal capacity 10 L). The solution for reaction in the reaction vessel A was added dropwise to the reaction vessel B at room temperature under stirring ammonia water. After completion of the dropwise addition of the solution for reaction, stirring was stopped. From the reacted solution divided into two layers of an aqueous layer and a butyl acetate layer, the aqueous layer containing by-products such as zinc chloride was removed to obtain ammonium bis (fluorosulfonyl) imide of butyl acetate solution as an organic layer. $^{19}$F-NMR (solvent: trideuteroacetonitrile) measurement was carried out on the obtained organic layer as a sample. In the obtained chart, the crude yield of the ammonium bis (fluorosulfonyl) imide contained in the organic layer was determined (756 mmol) from the amount of trifluoromethylbenzene added as an internal standard substance and the comparison of the integrated value of the peak derived from trifluoromethylbenzene with that derived from the target product.

$^{19}$F-NMR (solvent: trideuteroacetonitrile): δ 56.0

242 g of 15 mass % lithium hydroxide aqueous solution (1516 mmol as Li) was added to the ammonium bis (fluorosulfonyl) imide contained in the obtained organic layer such that the amount of lithium was 2 equivalents based on the ammonium bis (fluorosulfonyl) imide. The resulting mixture was stirred at room temperature for 10 minutes. Thereafter, aqueous layer was removed from the reacted solution to obtain a butyl acetate solution of lithium bis (fluorosulfonyl) imide. The obtained organic layer was used as a sample for analysis, it was confirmed by the ICP emission spectroscopic analysis that ammonium cations of fluorosulfonylimide were exchanged for lithium ions. The concentration of lithium bis (fluorosulfonyl) imide in the organic layer was 7 mass % (yield: 127 g, 73%).

The concentration of fluorosulfonylimide was determined from the amount of trifluoromethylbenzene added as an internal standard substance and the comparison of an integrated value of the peak derived from trifluoromethylbenzene with that derived from the target product, in the chart of the measurement results of $^{19}$F-NMR (solvent: trideuteroacetonitrile) measurement about the obtained organic layer as a sample.

The lithium bis (fluorosulfonyl) imide solution obtained by cation exchange was added to a rotary evaporator ("REN-1000", manufactured by IWAKI Corporation) and the solvent was distilled off under reduced pressure to obtain 282 g of a lithium bis (fluorosulfonyl) imide solution (concentration: 45 mass %).

Then, a flask (capacity: 500 mL) containing 200 g of the butyl acetate solution of lithium bis (fluorosulfonyl) imide having a concentration of 45 mass % was attached in a rotary evaporator ("REN-1000", manufactured by IWAKI Corporation). While blowing nitrogen gas into the liquid in the flask at a rate of 500 mL/min, rotation was started (100 rpm) while heating in a constant temperature water bath set at 60° C. Subsequently, the interior of the apparatus was gradually depressurized to 933 Pa, and a concentrating step was performed for 12 hours. The concentration of the obtained solution was 72 mass %. The amount of heat added in the concentrating step was 72,000 J per 1 g of lithium bis (fluorosulfonyl) imide.

125 g of toluene was added to 125 g of the obtained concentrated solution, and the mixture was allowed to stand at 25° C. for 1 hour to precipitate a solid of lithium bis (fluorosulfonyl) imide. The obtained solid was collected by filtration and vacuum dried at 50° C. to obtain powdered lithium bis (fluorosulfonyl) imide (LiFSI) [yield: 68 g, 76% (from concentrating step)]. The mass average particle diameter of obtained LiFSI was 50 μm. The water content was 52 mass ppm. In addition, the amount of residual solvent was 980 mass ppm. The loose bulk specific gravity of the obtained powder was 1.34.

Measurement of Moisture Absorption Rate 7 g of LiFSI obtained in each of Examples 1 to 3 and Comparative Example 1 was precisely weighed and put in a polyethylene bag having a thickness of 80 μm and a size of 50 mm×70 mm (trade name: Unipac Model No. A-8, manufactured by SEISANNIPPONSHA LTD.). Then, a chuck portion was sealed by welding with a heat sealer.

It was left under the condition of 23° C. and 65% humidity, and the mass changes after 30 minutes and 90 minutes were weighed with a precision balance. The average moisture absorption rates for 30 minutes are shown in Table 1.

TABLE 1

| minute | Example 1 mass ppm/ cm$^2$ · min | Example 2 mass ppm/ cm$^2$ · min | Example 3 mass ppm/ cm$^2$ · min | Example 4 mass ppm/ cm$^2$ · min | Comparative Example 1 mass ppm/ cm$^2$ · min |
|---|---|---|---|---|---|
| 0 | 0.00 | 0.00 | 0.00 | 0.00 | 0.00 |
| 30 | 0.00 | 0.00 | 0.00 | 0.00 | 2.77 |
| 90 | 0.00 | 0.00 | 0.00 | 0.00 | 1.43 |

As described in Examples 1 to 4, it was found that the bis (fluorosulfonyl) imide metal salts having an average particle diameter of not less than 0.1 mm were more difficult for moisture absorption and scattering, and easier for handling than that obtained in the Comparative Example 1.

INDUSTRIAL APPLICABILITY

In the present invention, the bis (fluorosulfonyl) imide metal salt and the method for preparing the bis (fluorosulfonyl) imide metal salt can be applied in various uses such as additives to electrolytes or fuel cell electrolytes, selective electrophilic fluorinating agents, photo acid generators, thermal acid generators, and near infrared absorbing dyes.

The invention claimed is:

1. A bis (fluorosulfonyl) imide metal salt which is an alkali metal salt of bis (fluorosulfonyl) imide or an alkaline earth metal salt of bis (fluorosulfonyl) imide, having an average particle diameter of not less than 0.2 mm.

2. A bis (fluorosulfonyl) imide metal salt which is an alkali metal salt of bis (fluorosulfonyl) imide or an alkaline earth metal salt of bis (fluorosulfonyl) imide, having an average moisture absorption rate of not more than 2.5 mass ppm/cm$^2$ min when sealed in a PE bag having a thickness of 80 μm and left for 30 minutes at 23° C. and 65% humidity.

3. The bis (fluorosulfonyl) imide metal salt of claim 1, having a shape being at least one selected from the group consisting of a plate, a rod, a block, a pulverized material, a pellet, a powder, a granule, a flake, a sphere, a hemisphere and a particle.

4. The bis (fluorosulfonyl) imide metal salt of claim 1, further having a loose bulk specific gravity of less than 1.20.

5. The bis (fluorosulfonyl) imide metal salt of claim 2, having a shape being at least one selected from the group consisting of a plate, a rod, a block, a pulverized material, a pellet, a powder, a granule, a flake, a sphere, a hemisphere and a particle.

6. The bis (fluorosulfonyl) imide metal salt of claim 2, further having a loose bulk specific gravity of less than 1.20.

7. The bis (fluorosulfonyl) imide metal salt of claim 3, further having a loose bulk specific gravity of less than 1.20.

* * * * *